Aug. 14, 1945. O. W. BONNAFE 2,381,999
WORK HOLDING FIXTURE FOR BROACHING MACHINES
Filed Nov. 11, 1943 4 Sheets-Sheet 4
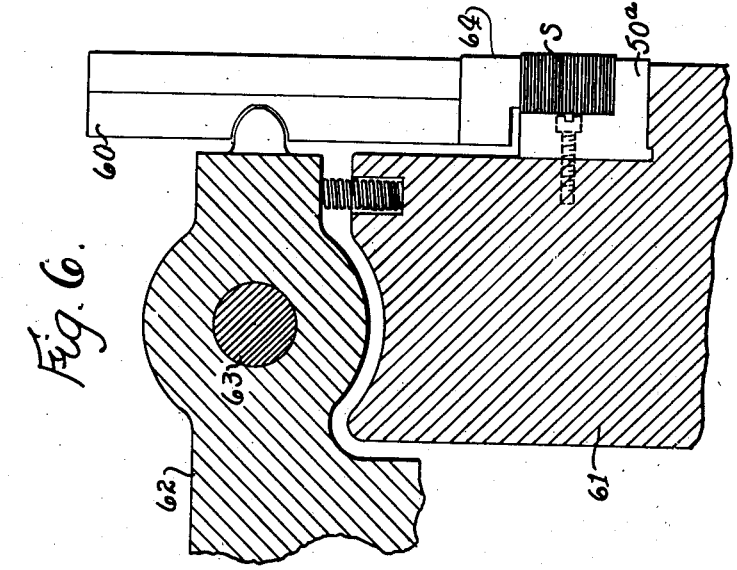
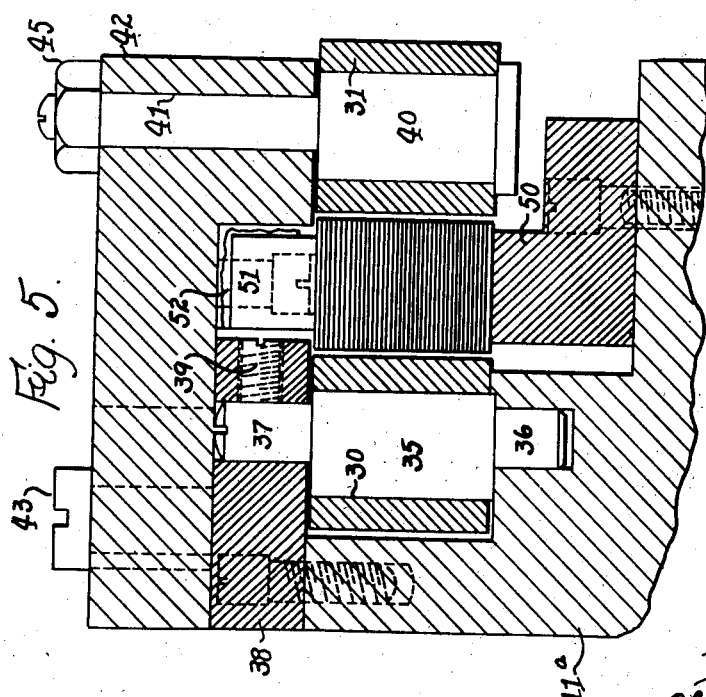
Inventor.
Oliver W. Bonnafe.
By Attorney.
Chas. T. Hawley Patented Aug. 14, 1945

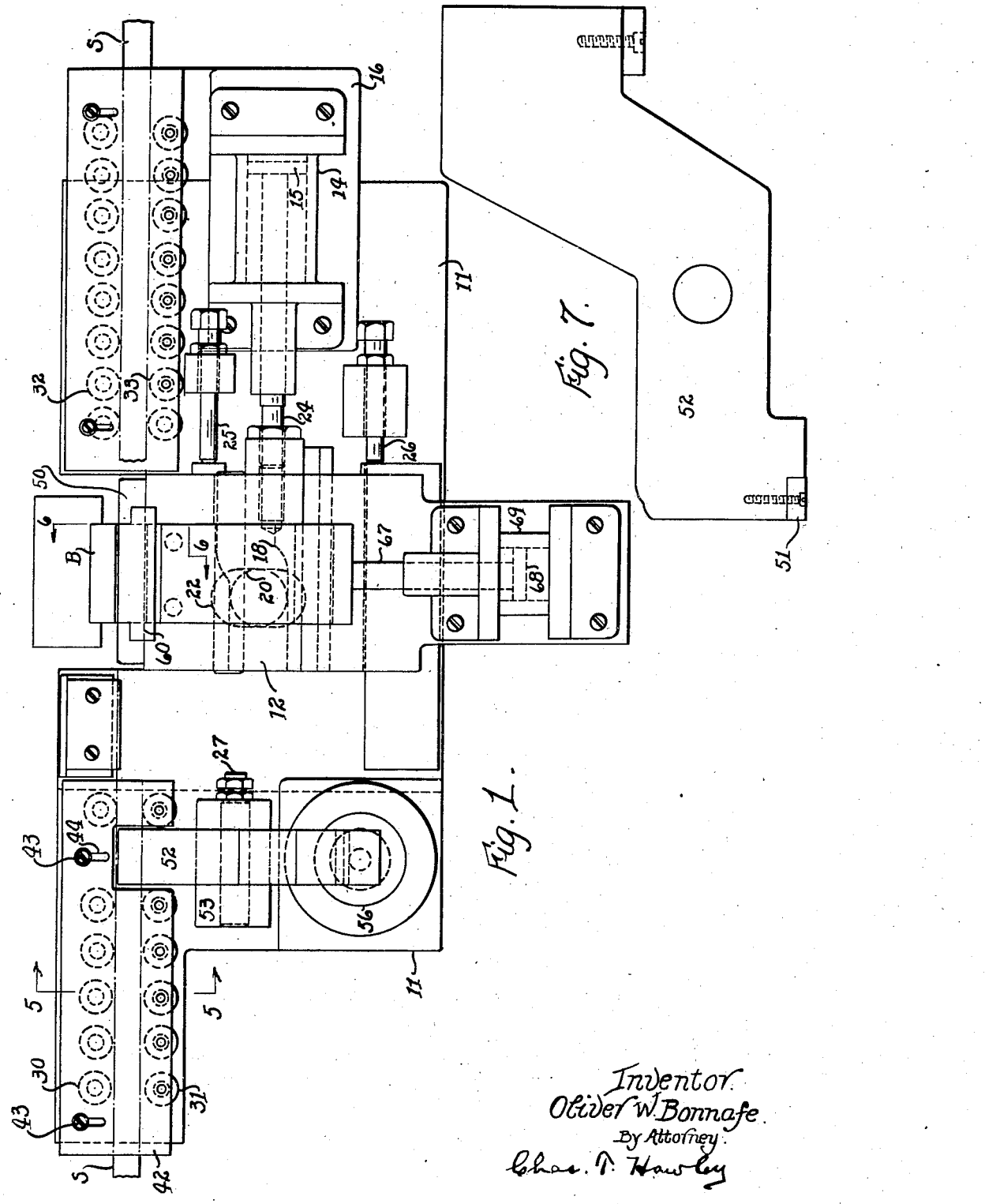

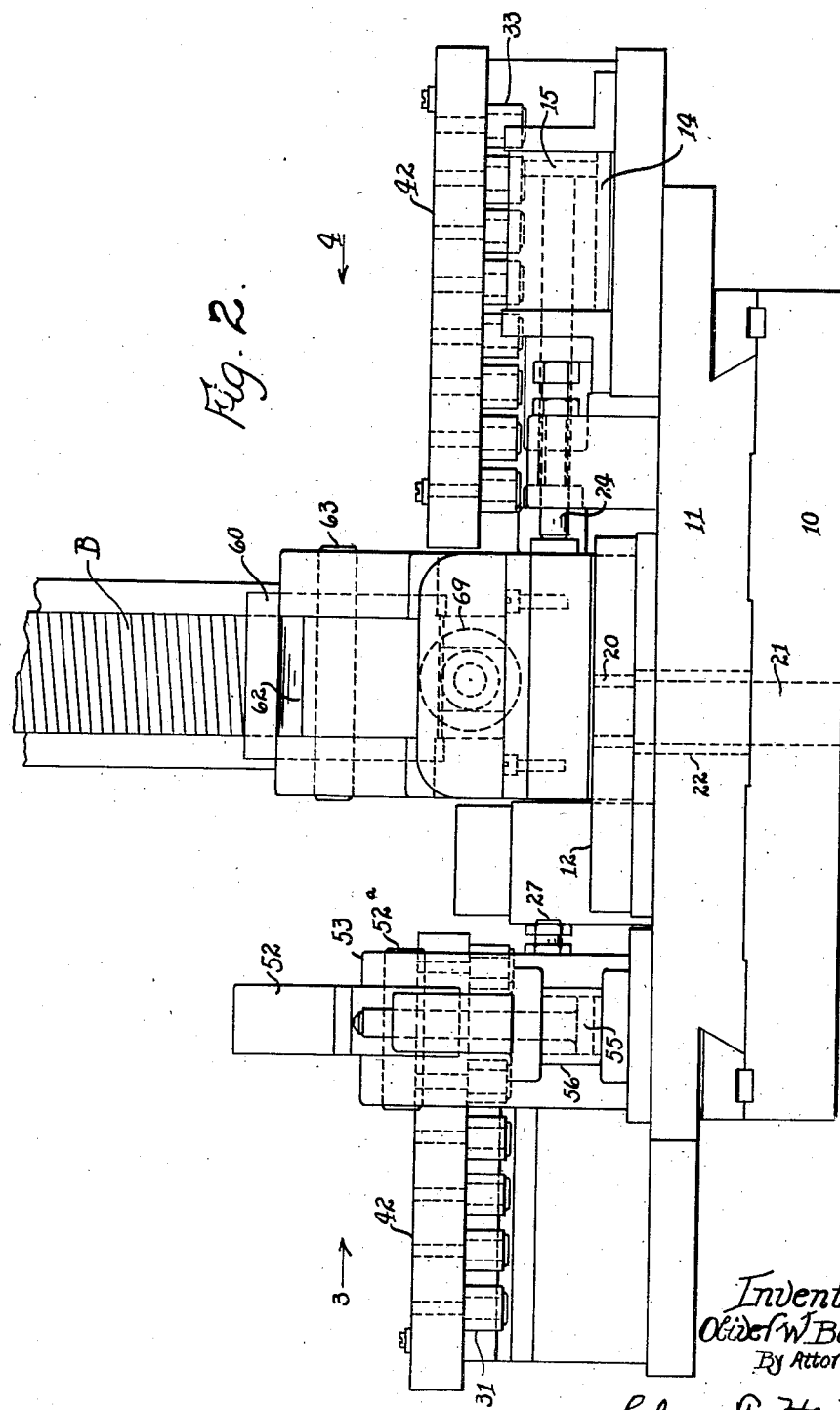

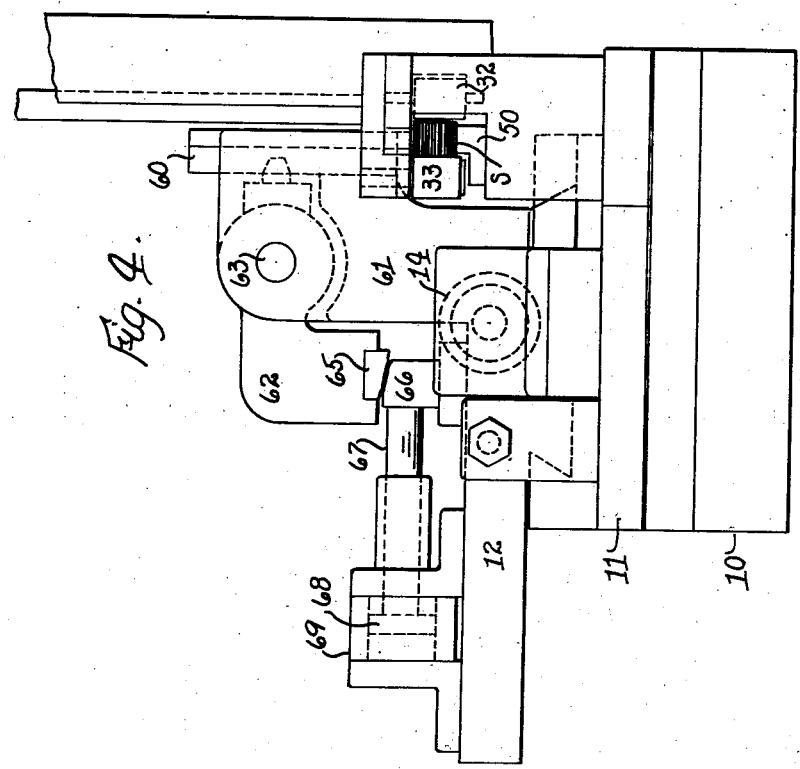
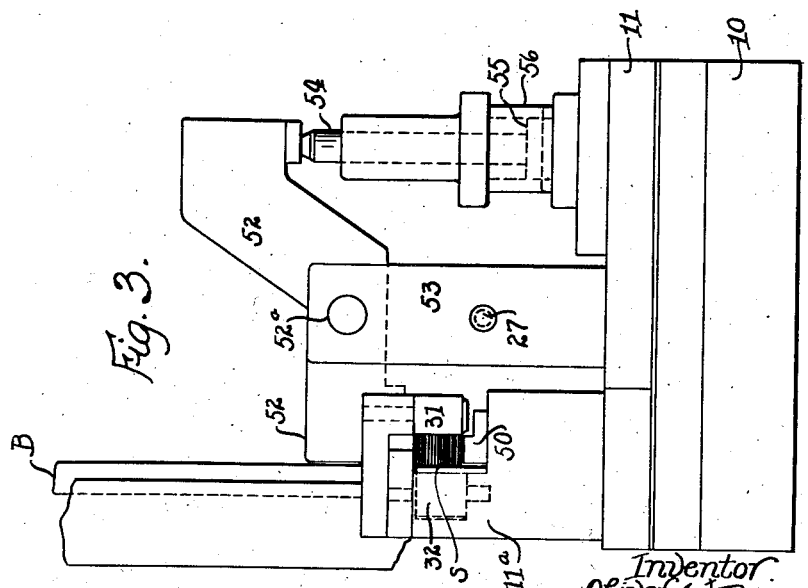

2,381,999

UNITED STATES PATENT OFFICE 2,381,999

WORK HOLDING FIXTURE FOR BROACHING MACHINES

Oliver W. Bonnafe, Hudson, Mass., assignor to The Lapointe Machine Tool Company, Hudson, Mass., a corporation of Maine Application November 11, 1943, Serial No. 509,925

7 Claims. (Cl. 90—33)

This invention relates to surface broaching machines and more particularly to a work-holding fixture by which stock may be conveniently held for a broaching operation and may be advanced for a succeeding operation.

My improved fixture is capable of general application in different types of machine tools, but is especially adapted for alternately holding and feeding a plurality of strips of metal, such as band saw stock, with respect to a surface broach adapted to cut a plurality of saw teeth therein at each broaching stroke. Such a broach is shown and described in the prior application of Wilrose J. Phaneuf, Serial No. 508,758.

It is the general object of my invention to provide a work-holding fixture by which a plurality of strips of metal may be held as a unit during a broaching or other machine operation, and by which they may be advanced as a unit between successive broaching operations and preferably during the return stroke of the broach.

A further object is to provide a fixture which will automatically withdraw the work from the face of the broach prior to the return of the broach, and which will thereafter automatically return the work to broaching position before the working stroke of the broach begins.

My invention further relates to arrangements and combinations of parts which will be hereinafter described and more particularly pointed out in the appended claims.

A preferred form of the invention is shown in the drawings, in which

Fig. 1 is a plan view of my improved broach-holding fixture;

Fig. 2 is a front elevation thereof;

Figs. 3 and 4 are end elevations of the machine, looking in the directions of the arrows 3 and 4 in Fig. 2;

Figs. 5 and 6 are detail sectional end elevations, taken along the lines 5—5 and 6—6 in Fig. 1 respectively; and Fig. 7 is a side elevation of a clamping lever.

Referring particularly to Figs. 1 and 2, my improved work-holding fixture comprises a base 10 which is firmly secured in fixed position on the body or frame of the broaching machine or other machine tool on which the fixture is to be used.

A support 11 is slidably mounted in guideways on the base 10 for movement forward and back in the machine, or toward and away from the broach B. A carriage 12 (Fig. 4) is mounted to slide longitudinally of the machine in guideways on the support 11. Such longitudinal movement of the carriage 12 is effected by a hydraulic cylinder 14 and piston 15 (Fig. 1) mounted on a plate 16 which in turn is secured to the sliding support 11.

The carriage 12 is provided with a cam groove 18 (Fig. 1) in its under side which cooperates with a cam roll 20 (Fig. 2) which is rotatably mounted at the upper end of a post 21 which in turn is secured in fixed position in the base 10 and extends freely through a transverse slot 22 (Figs. 1 and 2) in the sliding support 11.

As the carriage 12 is moved to the left in Fig. 1 by the piston 15 and its connecting piston rod 24, the fixed roll 20 coacts with the longitudinally moving cam groove 18 to move the support 11 and carriage 12 slightly forward or away from the broach B. When the carriage 12 is moved to the right in Fig. 1, a corresponding rearward movement of the work to broaching position will take place. The right-hand or broaching position of the carriage 12 is determined by adjustable stops 25 and 26 (Fig. 1), and the left-hand or feed position is determined by an adjustable stop 27.

The stock S, commonly in superposed strips, is fed into the machine at the left in Fig. 1 between a plurality of rear guide-rolls 30 and front guide-rolls 31. After being broached, the stock is guided to the right or delivery end of the machine between an additional plurality of back guide-rolls 32 and front guide-rolls 33. Each of these guide-rolls is mounted for limited adjustment forward and rearward, and the rolls are commonly set with increasing clearance away from the broaching position, as indicated in Fig. 1.

The means provided for adjustably mounting the guide-rolls is best shown in Fig. 5. Each back roll 30 (or 32) is mounted on a stud 35 having eccentric end portions 36 and 37. The end portion 36 is rotatable in a bearing in a raised flange 11a at the rear of the support 11, and the end portion 37 is similarly rotatable in a bearing in a plate 38 secured to the top of the flange 11a. The upper end of the portion 37 may be slotted to facilitate angular adjustment of the stud. The adjusted position of each stud 35 may be retained by a set-screw 39.

The eccentric position of the stud 35 relative to the end portions 36 and 37 will shift the axis of the roll 30 forward or rearward when the stud is turned angularly. It will be noted that the exact longitudinal position of each roll is immaterial.

Each front roll 31 (Fig. 5) is similarly mounted on a headed stud 40 having an eccentric end portion 41 mounted in a bearing in a top plate 42 which is secured to the plate 38 or to the flange 11a by binding screws 43 which extend through transverse slots 44 (Fig. 1) in the plate 42. With this construction, each front roll 31 may be independently adjusted forward or rearward by turning the end portion 41 of the stud 40 in the top plate 42 and securing it by a nut 45. The entire set of front rolls 31 may be adjusted forward or rearward as a unit by shifting the plate 42 and securing it in adjusted position by the screws 43.

The method of adjusting the rolls 32 and 33 at the delivery side of the machine is identical with that shown in Fig. 5 and above described. It will be noted that all of the guide-rolls are moved forward and rearward simultaneously with the sliding support 11 but that they do not move longitudinally with the carriage 12.

The strips of stock S are slidably supported on longitudinally extending guide bars 50 (Fig. 5) at each end of the support 11 and the strips are clamped against the guide-bar at the feed end by a clamping block 51 (Figs. 5 and 7) secured to the rear end of a clamping lever 52. The lever 52 is pivoted at 52a (Fig. 3) on a post 53 secured to the sliding support 11. At its front end, the lever 52 is engaged by the upper end of a piston rod 54 actuated by a piston 55 in an upright cylinder 56, also mounted on the support 11. When hydraulic pressure is applied in the cylinder 56, downward clamping pressure is applied by the block 51 (Fig. 5) to the stock S.

A plunger 60 (Figs. 1, 4 and 6) is mounted to slide vertically in guide-ways in a bracket 61 forming a rearward and upward extension of the carriage 12. A clamping lever 62 is pivoted at 63 in the brackets 61 and has a tooth-and-rack connection with the plunger 60 which has a clamping bar 64 at its lower end. This bar coacts with a segmental guide block or support 50a (Figs. 1 and 6) secured to the rear end of the carriage 12.

The lever 62 is provided with a cam block 65 engageable by a coacting cam block 66 mounted at the rear end of a piston rod 67 which is actuated by a piston 68 in a cylinder 69 mounted on the carriage 12.

When pressure is applied in the cylinder 69, the cam block 66 acts through the associated cam block 65 to rock the lever 62 and depress the plunger 60 and clamping block 64. It will be noted that all of these parts are mounted on the carriage 12, so that they move longitudinally when the carriage 12 is shifted longitudinally and so that they also have simultaneous forward and rearward movements with the sliding support 11.

Having described the details of construction of my improved work holding fixture, the method of operation and the utility thereof is as follows:

The stock S, preferably in the form of superposed strips of metal, is supplied to the fixture from the left in Fig. 1 and is supported on the left guide-bar 50 (Fig. 5) while it is guided to correct broaching position by the guide-rolls 30 and 31. Assuming that the stock has been inserted as far as its first broaching position and over the segmental supporting bar 50a, pressure is applied by the cylinder 69 to the clamping block 64 and by the cylinder 56 to the auxiliary clamping block 51.

The broach B then performs a downward broaching stroke and provides each strip of stock with a series of saw teeth for a length corresponding to the width of the broach.

Before the return or upward movement of the broach, the cylinder 69 is vented to release the clamping block 64, and pressure is applied in the cylinder 14 to slide the carriage 12 to the left until it engages the stop 27. Such movement to the left effects simultaneous forward movement of the support 11 and all parts carried thereby, through the coaction of the fixed roll 20 and the cam grooves 18 in the carriage 12.

The broach B is then given a return or upward movement out of contact with the work and pressure is applied in the cylinder 69 to clamp a fresh portion of the stock on the segmental supporting bar 50a by the clamping block 64. Pressure is then released in the cylinder 56, thus freeing the auxiliary clamping block 51, after which reverse of pressure in the cylinder 14 returns the carriage 12 to initial position and simultaneously returns the entire assembly to original rearward or operative position.

During this return movement, the stock clamped between the bar 50a and the block 64 is drawn to the right as a unit by the movement of the carriage 12.

After this feeding movement is completed, pressure is again applied in the cylinder 56 to additionally clamp the stock by the auxiliary clamping block 51. The machine is then ready for the next broaching operation.

Any suitable control and timing mechanism may be provided for controlling the successive operations of the operating cylinders 14, 56 and 69 and for timing the broaching and return movements of the broach B. Such timing and control devices are commercially well known and in themselves form no part of my present invention.

Having thus described my invention and the advantages thereof, I do not wish to be limited to the details herein disclosed, otherwise than as set forth in the claims, but what I claim is:

1. A work holding fixture comprising a base, a support slidable forward and rearward on said base, a carriage slidable longitudinally on said support and perpendicular to the path of movement of said support, a main work clamp on said carriage, an auxiliary work clamp on said support, and means to open and close said clamps alternately and successively.

2. A work holding fixture comprising a base, a support slidable forward and rearward on said base, a carriage slidable longitudinally on said support and perpendicular to the path of movement of said support, a main work clamp on said carriage, an auxiliary work clamp on said support, means to open said main clamp and to move it with said carriage longitudinally in one direction while the auxiliary clamp is closed, and means to close said main clamp and to move it with said carriage longitudinally in the opposite direction to feed the work while the auxiliary clamp is open.

3. A work holding fixture comprising a base, a support slidable forward and rearward on said base, a carriage slidable longitudinally on said support, a main work clamp on said carriage, an auxiliary work clamp on said support, a guide-bar fixed on said support and coacting with said auxiliary clamp, a segmental guide-bar fixed to said carriage and coacting with said main clamp, and means to open and close said clamps alternately and successively and in selected relation to the longitudinal movements of the carriage.

4. In a surface broaching machine having a vertically reciprocated broach, in combination, a base, a support slidable on said base toward and from said broach, a carriage on said support slidable longitudinally relative to said broach, means effective to move said carriage longitudinally on said support, and coacting means effective to move said support and carriage away from the broach and out of broaching position as said carriage is moved in one direction on said support and before the return stroke of the broach and effective to return said support and carriage toward the work and to broaching position as the carriage is moved in the opposite direction on said support after the return stroke of the broach but before the broaching stroke thereof begins.

5. A work holding fixture comprising a base, a support slidable forward and rearward on said base, a carriage slidable longitudinally on said support to feed the work, means to give said carriage alternate work feeding and non-feeding movements, and means to move said carriage forward from operating position during a non-feeding movement thereof and to return said carriage rearward to operating position during a work feeding movement thereof.

6. A work holding fixture comprising a base, a support slidable forward and rearward on said base, a carriage slidable longitudinally on said support to feed the work, means to give said carriage alternate work feeding and non-feeding movements, means to move said carriage forward from operating position during a non-feeding movement thereof and to return said carriage to operating position during a work feeding movement thereof, and adjustable means on said support to limit movement of said carriage in both directions.

7. A work holding fixture comprising a base, a support slidable forward and rearward on said base, a carriage slidable forward and rearward on said base, a carriage slidable longitudinally on said support, a main clamp on said carriage, an auxiliary clamp on said support, a hydraulic cylinder and piston connected to move said carriage, cam means to move said support simultaneously forward or rearward with movement of said carriage, a second hydraulic cylinder and piston connected to open and close said main clamp, and a third hydraulic cylinder and piston connected to open and close said auxiliary clamp, said first and third cylinders being mounted on said support and said second cylinder being mounted on said carriage.

OLIVER W. BONNAFE.